(12) United States Patent
Graham et al.

(10) Patent No.: US 9,989,978 B2
(45) Date of Patent: Jun. 5, 2018

(54) NATURAL GAS PRESSURE REGULATOR HAVING ADJUSTABLE VALVE SEAT

(71) Applicant: ITT MANUFACTURING ENTERPRISES LLC, Wilmington, DE (US)

(72) Inventors: Gary E. Graham, Seneca, SC (US); Jeffrey B. Gotthelf, Fair Play, SC (US); Darrell T. Wiley, Walhalla, SC (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 77 days.

(21) Appl. No.: 15/002,684

(22) Filed: Jan. 21, 2016

(65) Prior Publication Data
US 2017/0212534 A1 Jul. 27, 2017

(51) Int. Cl.
*G05D 16/10* (2006.01)

(52) U.S. Cl.
CPC ...... *G05D 16/106* (2013.01); *Y10T 137/7808* (2015.04)

(58) Field of Classification Search
CPC .................. G05D 16/106; Y10T 137/7808
See application file for complete search history.

(56) References Cited

U.S. PATENT DOCUMENTS

| | | | |
|---|---|---|---|
| 3,479,004 A | 11/1969 | Brumm | |
| 4,493,434 A | 1/1985 | Beaujean et al. | |
| 5,152,318 A | 10/1992 | Ortner et al. | |
| 5,419,530 A | 5/1995 | Kumar | |
| 6,321,779 B1 | 11/2001 | Miller et al. | |
| 6,997,348 B2 | 2/2006 | Droppleman | |
| 7,471,882 B2 | 12/2008 | Peebles et al. | |
| 7,712,483 B2 | 5/2010 | Nigliazzo et al. | |
| 8,015,993 B2 | 9/2011 | Sachs | |
| 8,033,293 B2 | 10/2011 | Checiches et al. | |

(Continued)

FOREIGN PATENT DOCUMENTS

| | | |
|---|---|---|
| EP | 1 891 319 B1 | 11/2010 |
| FR | 3 003 656 A1 | 9/2014 |

(Continued)

OTHER PUBLICATIONS

International Search Report and Written Opinion for PCT/US2017/014255; dated Apr. 21, 2017; 11 pages.

*Primary Examiner* — Kevin Lee
(74) *Attorney, Agent, or Firm* — Barclay Damon, LLP

(57) ABSTRACT

A gas pressure regulator includes a body having respective inlet and outlet ports and an interior chamber defining a gas flow path. A hollow piston is moved in relation to a valve seat to create a junction through which gas is directed along the flow path to the outlet port. The piston engages a valve seat, thereby defining relative open and closed positions based on the position of the piston and the pressure of the gas, the piston being axially biased by a spring. The valve seat is attached to an adjustment member having at least one externally accessible feature to enable the axial position of the valve seat to be varied relative to the spring biased piston. In one version, the gas pressure regulator can include a heater assembly extending into the flow path adjacent the outlet port, enabling ported gas to be heated before introduction, e.g., into an engine.

20 Claims, 6 Drawing Sheets

(56) References Cited

U.S. PATENT DOCUMENTS

| | | | |
|---|---|---|---|
| 8,104,742 B2 | 1/2012 | Ishihara et al. | |
| 8,276,612 B2 * | 10/2012 | Folk | F16K 31/365 137/489 |
| 8,307,843 B2 | 11/2012 | Patterson et al. | |
| 9,400,060 B2 * | 7/2016 | Garvey et al. | G05D 16/166 |
| 2016/0048138 A1 | 2/2016 | Mussot | |

FOREIGN PATENT DOCUMENTS

| | | | | |
|---|---|---|---|---|
| WO | WO 2006/133736 | * | 12/2006 | F02M 21/06 |
| WO | WO 2008/059429 A2 | | 5/2008 | |
| WO | WO 2015/008200 A1 | | 1/2015 | |

\* cited by examiner

NATURAL GAS PRESSURE REGULATOR HAVING ADJUSTABLE VALVE SEAT

TECHNICAL FIELD

This application generally relates to the field of pressure regulators and more specifically to a pressure regulator used in conjunction with a gas line, such as those typically provided in a natural gas powered vehicle, that enables selective and dynamic external set point pressure adjustment.

BACKGROUND

Conventional gas pressure regulators used in natural gas powered systems, such as those employed in vehicles, typically include a housing having an inlet port, an outlet port and a gas flow path that is created within a regulator body or housing between the inlet and outlet ports. The delivery pressure of gas is regulated using a sensing element, such as a diaphragm, which is typically spring loaded and associated with a valve, the latter being configured to open and close based on demand. Within the housing, a hollow piston pressure sensing element, having a pair of opposing open ends, is disposed in a biased state relative to a defined inlet through which gas flows to the outlet port via a gap or spacing provided between the end of the hollow piston and a fixed valve seat. In these pressure regulators, the properties of the biasing spring acting on the piston can be adjusted in order to adjust the set point pressure of the regulator. These adjustments, which are typically done at the manufacturing level, are based upon buildups in tolerancing of the components of the regulator. As such, there is no true capability to provide external pressure set point adjustability for these regulator designs.

BRIEF DESCRIPTION

According to a first version, there is provided a gas pressure regulator comprising a regulator body that includes an inlet port, an outlet port and an interior. A piston is supported for axial movement within the interior of the regulator body, the piston being hollow and including a first open end that extends into a gas inlet junction and a second open end, the second end of the hollow piston being fluidically connected to the outlet port and defining a gas flow path. A spring is configured for biasing the piston in a first position relative to the gas inlet junction. A set point adjustment member includes a valve seat at one end, the set point adjustment member being axially disposed in relation to the first end of the piston wherein open and closed positions are defined in the gas inlet junction through which gas can be ported along the defined flow path extending through the hollow piston and extending to the outlet port. The set point adjustment member is disposed opposite the first end of the piston and defining a variable spacing therebetween to define the open and closed positions and in which the axial position of the set point pressure adjustment member can be varied in order to adjust set point pressure of the regulator. According to one version, the set point pressure adjustment member includes a threaded portion that is engageable with a threaded port of the regulator. In a preferred version, the set point pressure adjustment member includes an externally accessible engagement feature to permit axial adjustment of the valve seat.

According to another aspect, the gas pressure regulator can further comprise a heater assembly disposed adjacent the outlet port. In one version, the heating assembly includes a heater element that is maintained within a housing configured to extend transversely relative to the gas flow path. The housing can be made from a heat conductive material and can further include a set of external fins through which the gas is configured to flow. In addition, an internal or external switch can be provided to manually turn off the heater element or automatically cut electrical power to the heating element at a preset temperature.

According to another aspect, there is provided a gas pressure regulator comprising a body having a piston that is movably disposed within the body relative to an inlet port in which flowing gas is directed, the piston being biased by a spring and in which a valve seat is disposed opposite the biased piston. A set point adjustment member can include a threaded portion and the valve seat, the latter being disposed on a distal end thereof. The set point adjustment member includes an external engagement feature that can be accessed in order to permit selective adjustment of the axial position of the valve seat relative to the biased piston.

In one version, the pressure regulator further includes a heater assembly including a finned portion that is positioned within the defined gas flow path such that outlet gas can be heated before introduction, for example, into a vehicle engine. In addition, the regulator can further include ports that can circulate fluid, such as antifreeze, through the regulator body in order to heat the gas.

According to yet another aspect, there is provided a method for adjusting the set point pressure of a liquefied natural gas (LNG) pressure regulator, the method comprising the steps of: porting LNG through an inlet port of the pressure regulator, providing a junction including a hollow piston biasedly engaged with a spring, providing a set point adjustment member relative to the junction, and selectively adjusting the axial position of the set point adjustment member relative to the biased piston for adjusting the set point pressure of the regulator. In one version, the adjustment member includes at least one externally accessible engagement feature that enables the position of the attached valve seat to be selectively and dynamically adjusted.

A number of advantages are realized using the herein described design. For example, one advantage of the herein described pressure regulator is the ability to provide an externally accessible feature that enables selective axial adjustment of the set point adjustment member and therefore the position of the valve seat relative to the biased piston assembly to be varied. This latter feature enables dynamic adjustments to be made to the set point pressure, as needed.

Another advantage realized is that liquefied natural gas (LNG) can be heated prior to porting the natural gas from the pressure regulator to the engine.

Yet another advantage is that a robust and reliable design can be realized and without a tight tolerancing budget, thereby simplifying the overall manufacture, improving assembly failure rate, and also enabling the pressure regulators to be built and commercially sold at a lower cost.

Still another advantage is that the herein described pressure regulator design that enables adjustment via axial positioning of the valve seat also provides greater versatility based on changing environmental conditions and/or other conditions or factors.

In addition, the pressure regulator can be further equipped with passages to circulate hot engine antifreeze or other vehicle fluid through the body, in order to heat the gas flowing through the device.

The pressure regulator may also be equipped with an internal or externally mounted temperature switch enabling electrical power of the retained heating element to be cut off at a preset temperature.

These and other features and advantages will be readily apparent to a person of sufficient skill from the following Detailed Description, which should be read in conjunction with the accompanying drawings.

DETAILED DESCRIPTION

The following description relates to a specific embodiment of a pressure regulator that can be used in conjunction with a natural gas vehicle and more specifically to fluidically link or couple a source of liquefied natural gas (LNG) for porting to the vehicle engine. As described herein, the inventive regulator includes an external and accessible feature that enables the set point pressure of the regulator to be selectively adjusted. According to the description that follows the position of a valve seat, provided at a distal end of the axially adjustable member, can be selectively varied in relation to a spring-loaded piston that provides a flow path for LNG entering the pressure regulator for porting to the vehicle engine.

According to another aspect, the pressure regulator can be further equipped with an assembly that heats the LNG being outletted (ported) from the pressure regulator to the vehicle engine. In at least one version, a heater assembly includes a housing or body made from a heat conductive material that is configured and sized to retain a heating element. A portion of the housing of the heating assembly retaining the heating element can further include a set of externally disposed fins that facilitates heat transfer to the flowing gas in a uniform manner wherein the housing portion can be advanced transversely relative to the outlet port of the pressure regulator. In one version, the heating element can include a radiative source, such as a glow plug, though alternatively other forms of heating means that enable the flowing natural gas to be suitably heated can be incorporated. Still further, a flow conduit can further be provided using additional ports to circulate hot engine antifreeze or other fluid through the regulator to heat the gas.

As noted, the following description is based on a specific embodiment, although it will be readily apparent to a person of sufficient skill that a myriad of alternative versions and modifications are possible that also embody the inventive concepts which are discussed herein. In addition, several terms are used throughout the following discussion of the embodiment in order to provide an adequate frame of reference with regard to the accompanying drawings. These terms, such as "distal", "proximal", "inner", "outer", "external", "internal" and the like are not intended to narrow the overall scope of the invention, unless so specifically stated. In addition, the drawings are intended to illustrate the salient features of the herein described gas pressure regulator, but are not necessarily drawn to scale. As a result, one should not overly rely upon the accompanying drawings for purposes of determining size, scaling or the like.

Figure 1:
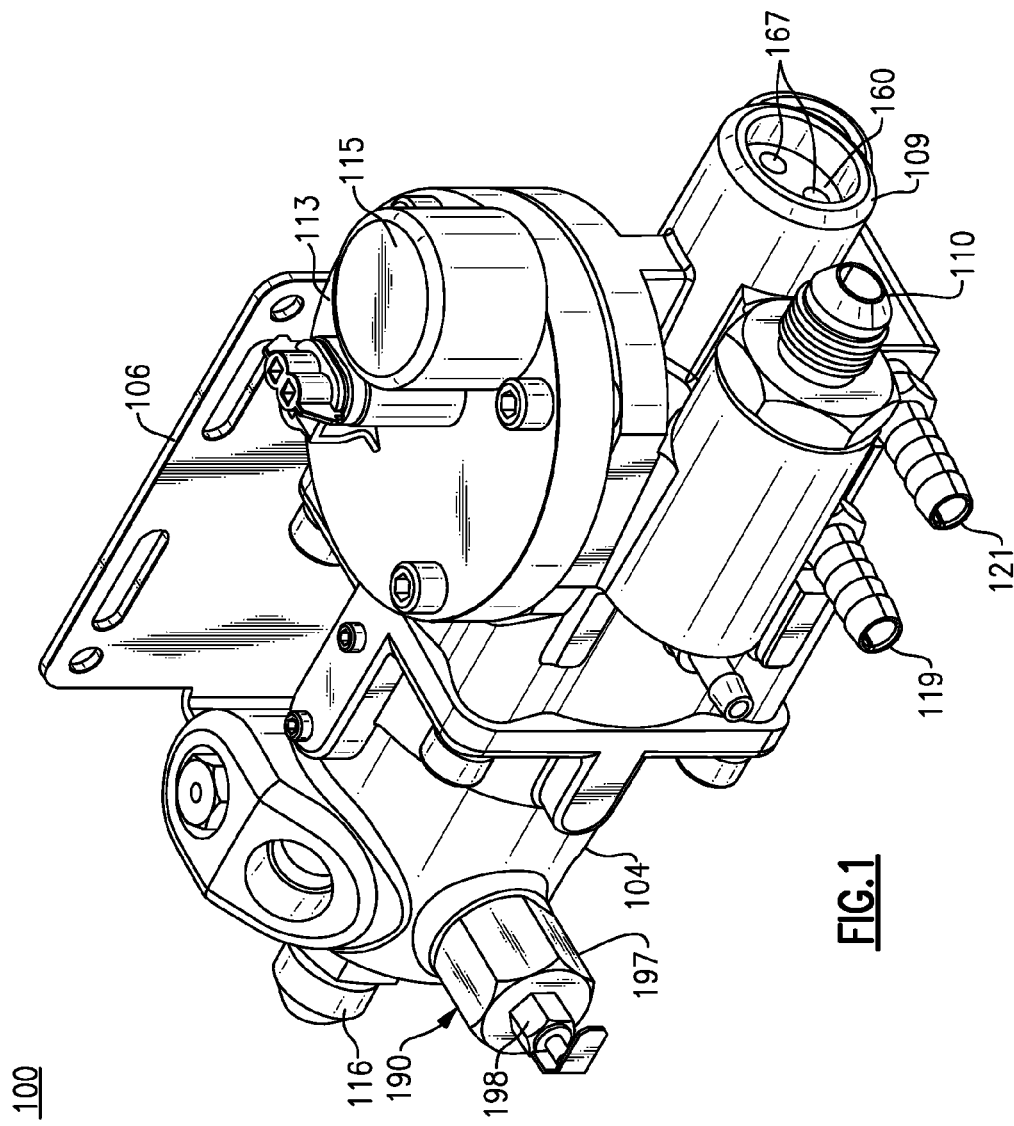
FIG. 1 is a perspective view of a gas pressure regulator which is made in accordance with an embodiment of the present invention.

Referring to the figures and more specifically FIG. 1, a pressure regulator 100 is defined by a housing or body 104 made from an appropriate structural material, such as aluminum, brass or a stainless steel. The body 104 includes an inlet port 110 that extends outwardly from one side of the body 104 with a corresponding outlet port 116 extending from an opposite side of the body 104. According to this embodiment, the inlet port 110 is adjacent to a pair of cooling ports 119, 121 used to circulate a fluid, such as hot engine antifreeze along a defined conduit within the regulator body 104. The precise location of any of the ports 110, 116, 119, 121 can be suitably varied. The pressure regulator 100 further includes a cover 113, as well as a solenoid valve 115 that is configured to act upon a contained diaphragm 117, (partially shown in FIG. 2), the foregoing acting as a sensing element that is biased by a spring 118 (also partially shown in FIG. 2). The inlet port 110 is fluidically connected to the interior of the pressure regulator 110 through a sealed connection to a supply of LNG (not shown) and the outlet port 116 is similarly and fluidically connected to an engine (not shown). Each of the ports 110, 116 include couplings that permit secure and releasable attachment to interconnecting hoses (not shown). The pressure regulator 100 further includes a mounting plate or bracket 106 having a plurality of spaced openings, permitting the use of fasteners (not shown) in order to effectively secure the pressure regulator 100 within the vehicle (not shown).

A set point pressure adjustment member 160, partially shown in FIG. 1, is disposed within a defined port 109 of the regulator body 104. As discussed herein, an externally accessible portion of the set point pressure adjustment member 160 includes a pair of spaced openings 167 or other engagement feature(s) in order to permit the axial position of the set point pressure adjustment member 160, having an attached valve seat 174, FIG. 2, to be selectively varied.

Figure 2:
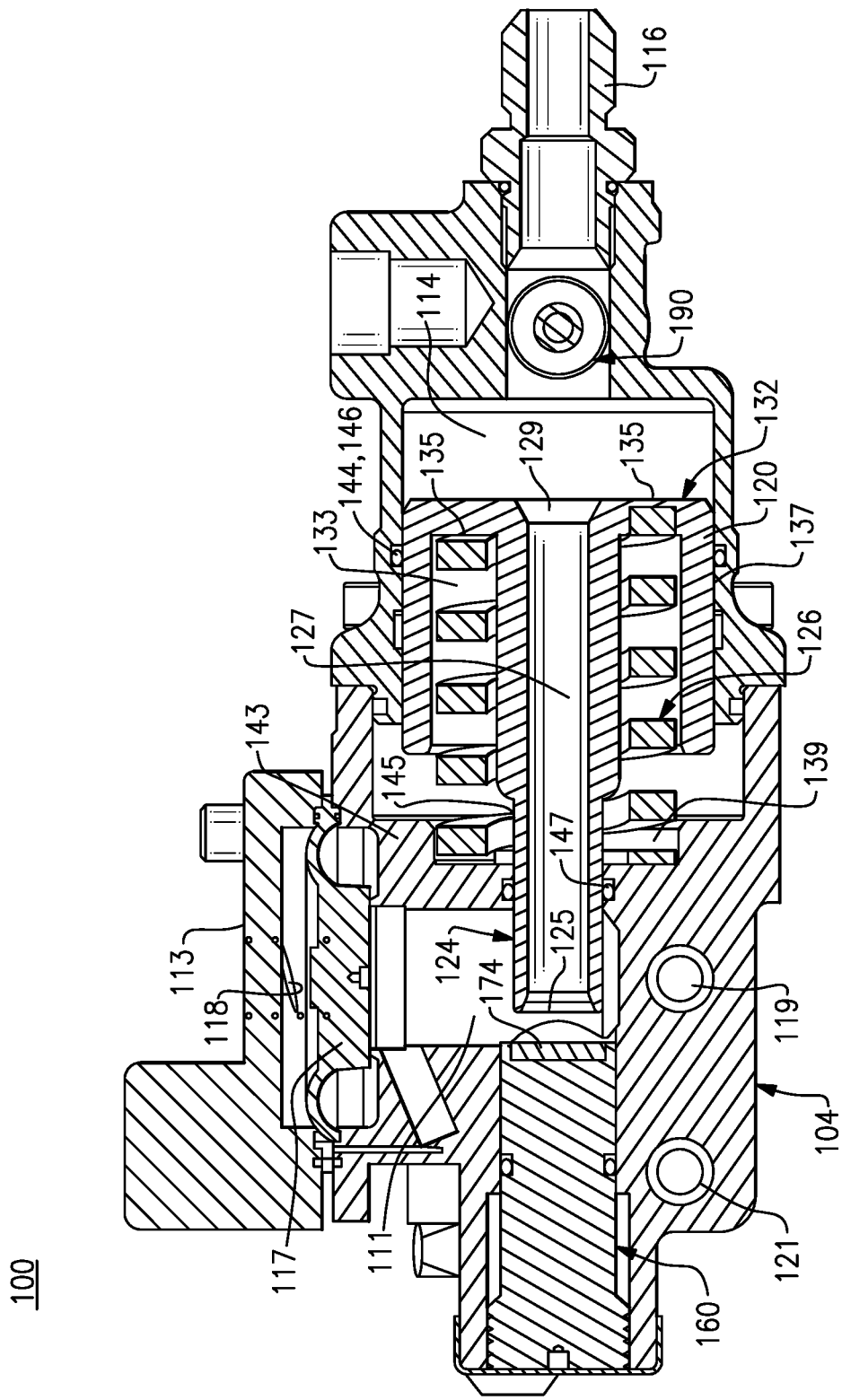
FIG. 2 is a partial side elevational view of the gas pressure regulator of FIG. 1, shown in section.
Figure 3:
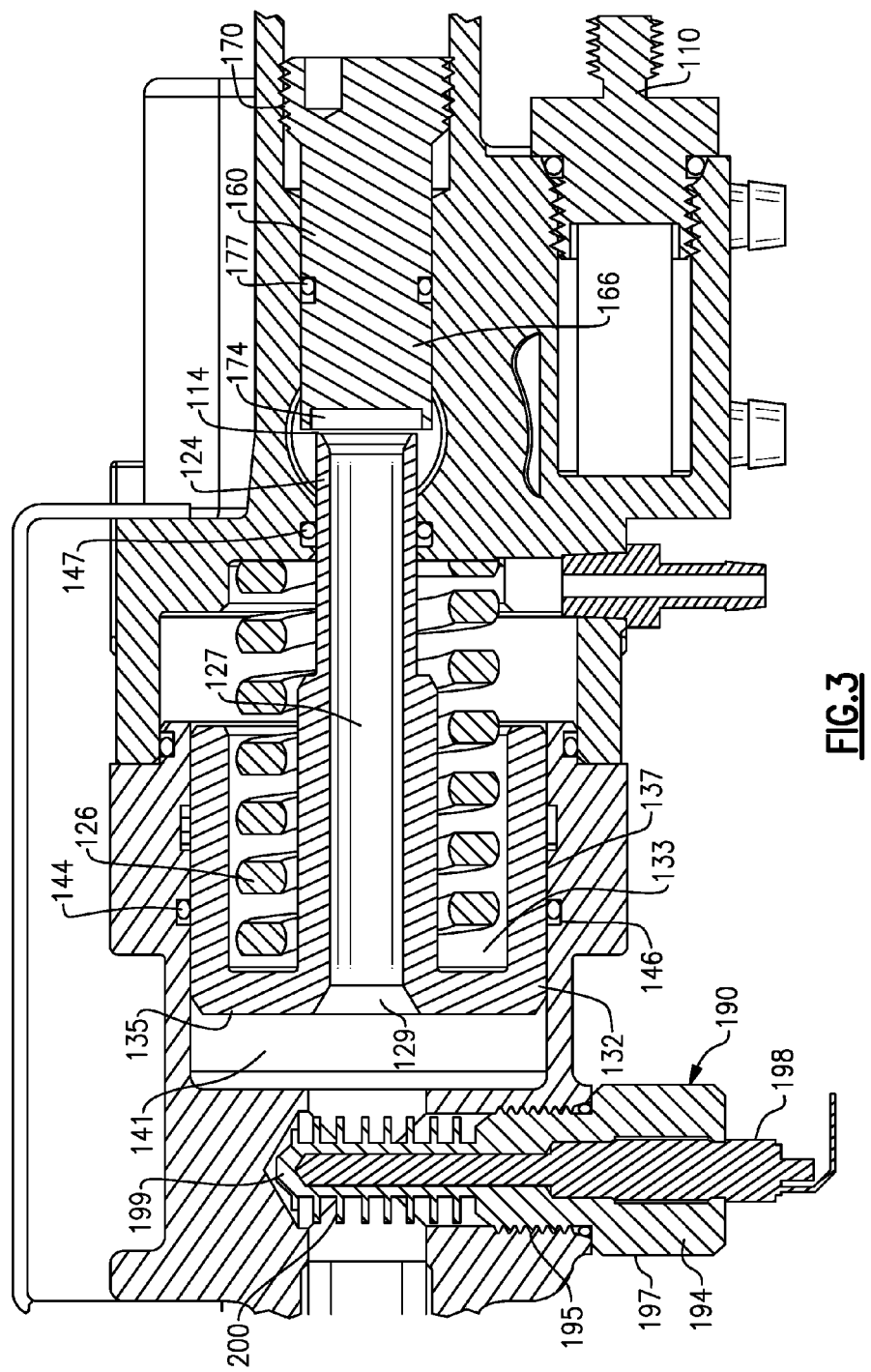
FIG. 3 is a partial side elevational view of the gas pressure regulator of FIGS. 1 and 2, rotated 90 degrees from that depicted in FIG. 2, in a first or closed position.

As discussed in greater detail herein, the set point adjustment member 160 is axially movable within the defined port 109 of the regulator body 104. With reference to FIGS. 1 and 2, the inlet port 110 is attachable to a source of liquefied natural gas (LNG) (not shown). LNG entering the inlet port 110 is preferably directed to a filter port (not shown) that further directs the flowing LNG along an inlet path formed in the regulator body 104. A junction 114, FIG. 3, is aligned with a defined chamber 111 relative to the spring-loaded diaphragm 117 and the cover 113, as well as the solenoid valve 115 that creates a sensing element for the pressure regulator 100. Each of these features enable or permit flowing LNG to enter through the junction 114 and be ported to the outlet port 116 and subsequently to the engine (not shown) based on need/demand. Details relating to the formed junction 114, as well as the spring-loaded diaphragm 117 and solenoid valve 115 conventionally well known to those in the field and do not form a specific part of the invention.

Figure 4:
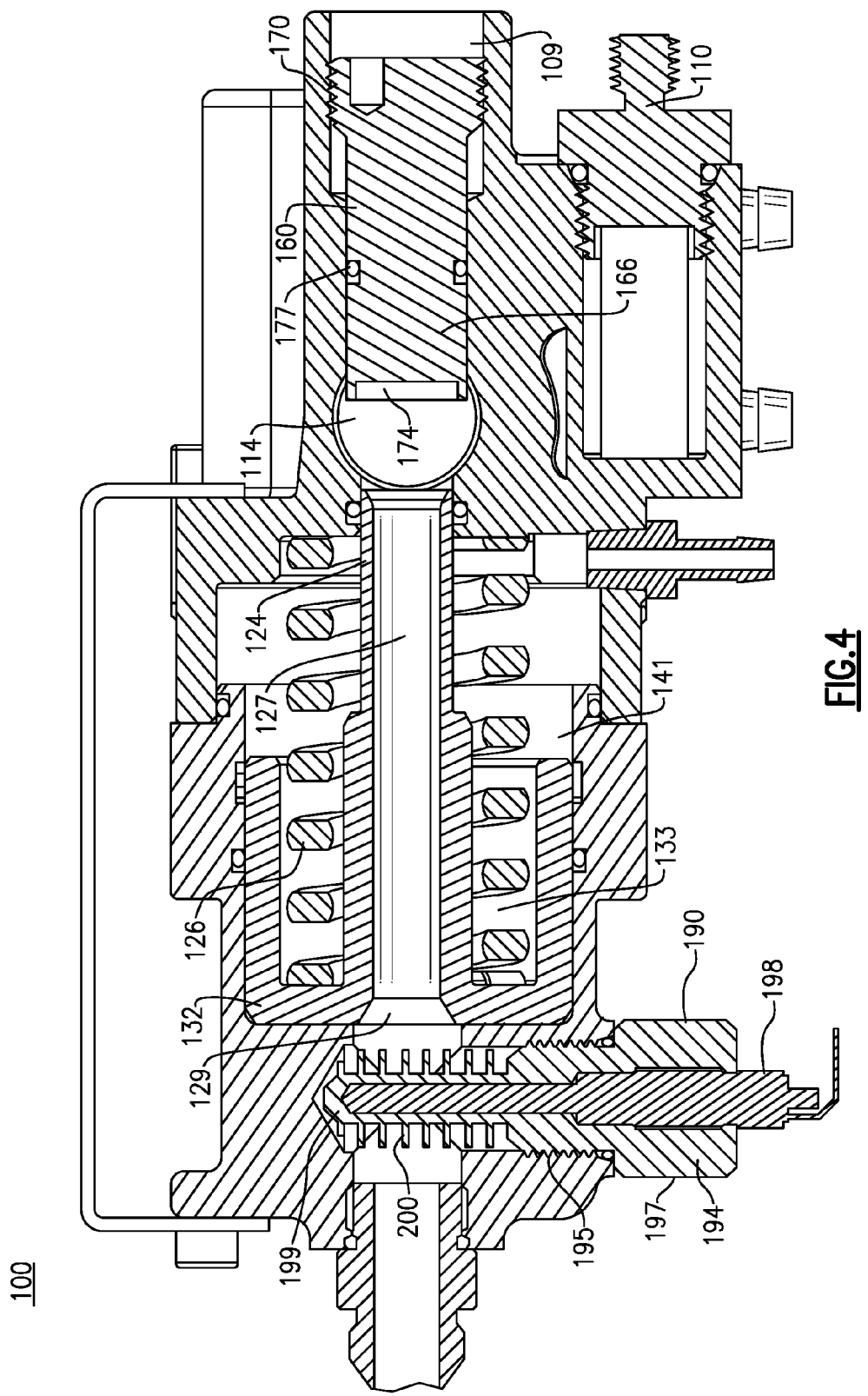
FIG. 4 is the side elevational view of the gas pressure regulator of FIG. 3, in a second or open position.
Figure 5:
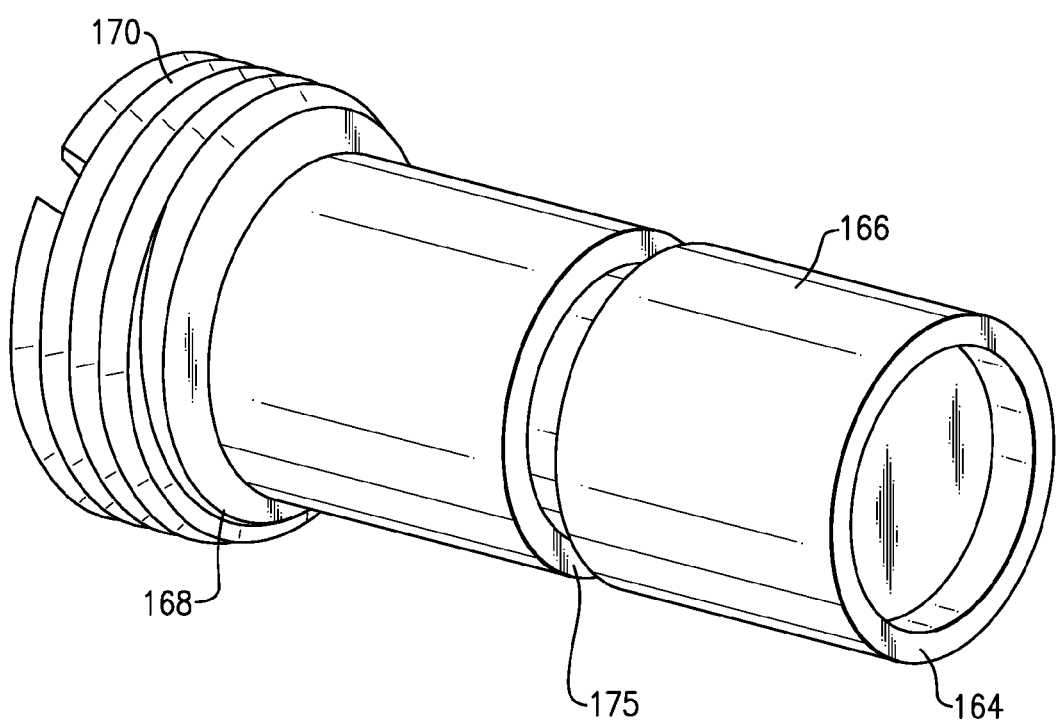
FIG. 5 is a perspective view of a set point pressure adjustment member in accordance with an embodiment that can be used in the gas pressure regulator of FIGS. 1-4.
Figure 6:
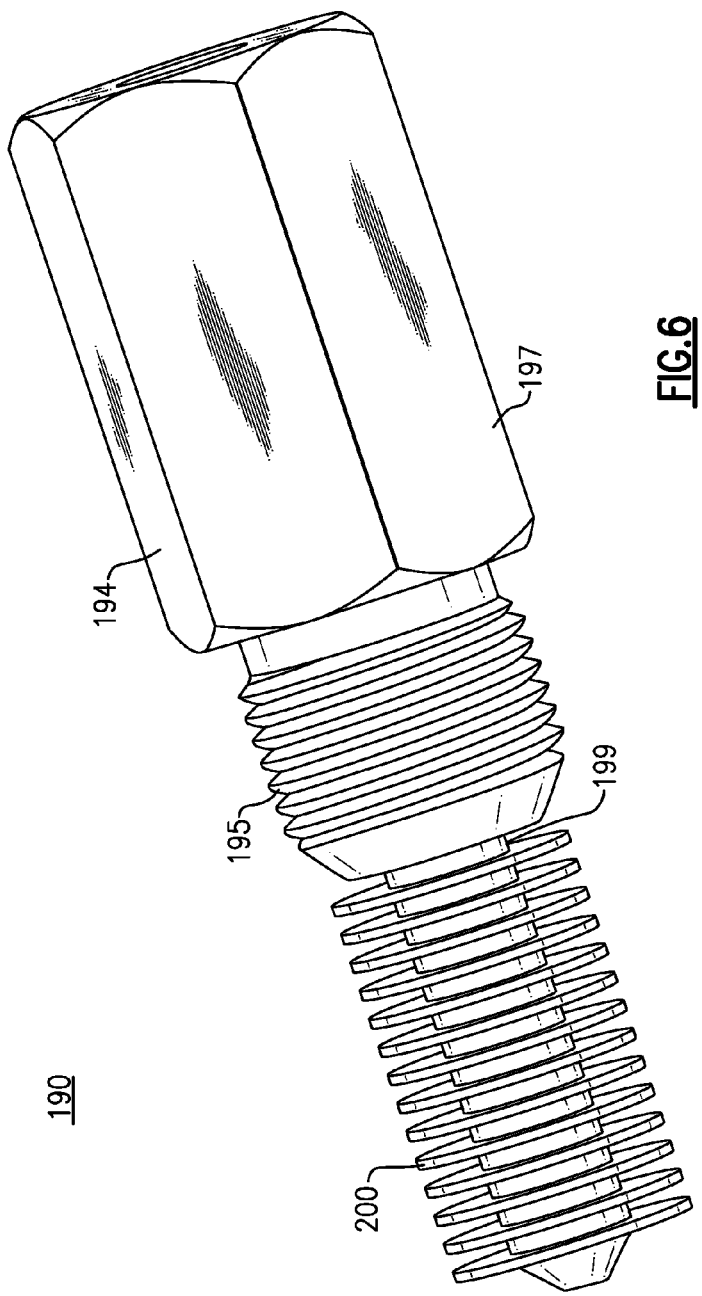
FIG. 6 is a perspective view of a heater assembly in accordance with an embodiment that can be used in the gas pressure regulator of FIGS. 1-4.

With reference to FIGS. 2-4, a piston assembly 120 is biasedly movable in a reciprocating and axial direction within the interior of the regulator body 104 using an attached biasing spring 126. According to this specific embodiment, the piston assembly 120 is defined by a tubular piston stem 124 having an open distal end 125, as well as a hollow interior 127. The piston stem 124 extends through an opening 145 formed within a fixed intermediate interior wall 143 of the regulator body 104 and further extends within an annular recess 133 formed in a piston head 132, the piston stem 132 terminating at an opposing proximal open end 129 that is coincident with an end surface 135 of a piston head 132. The piston head 132 is a substantially cylindrically shaped member having the annular recess or cavity 133, an exterior annular surface 137, and the end surface 135. The biasing spring 126, according to this specific embodiment, is a compression spring having an inner diameter that overlays the exterior of the piston stem 124 with an axial portion of the biasing spring 126 being disposed within the annular recess 133 of the piston head 132. One end of the biasing spring 126 is retained within a cavity 139 formed in the fixed intermediate interior wall 143 of the housing 104 with the piston stem 124, and more particularly the open distal end 125 thereof, extending through the opening 145 of the intermediate interior wall 143 of the regulator body 104 and into the chamber 111.

Still referring to FIGS. 2-4, the piston head 132 is further sized and configured to fit movably within a substantially cylindrical cavity 141 that is formed in the regulator body 104. At least one sealing member 144 is disposed within a groove 146 defined in an interior wall of the cavity 141. The interior of the opening 145 of the intermediate wall 143 of the regulator body 104 similarly includes at least one sealing member 147, such as an elastomeric ring, that is provided within an annular groove formed in an intermediate portion of the opening 145.

In use, the compression spring 124 biases the piston assembly 120, and more specifically the piston stem 124, to a first (or closed) position that extends within the chamber 111 and into the defined junction 114, as shown most clearly in FIGS. 2 and 3 that define a closed position. FIG. 4 depicts the pressure regulator 100 in an open position that permits the flow of ported gas.

With reference to FIGS. 2-5, the set point pressure adjustment member 160 according to this specific embodiment is defined by a elongate and substantially cylindrically shaped body 164, having a distal end 166 as well as an opposing proximal end 168. As previously noted, the set point pressure adjustment member 160 is mounted within the defined port 109 of the regulator body 104. More specifically, the proximal end 168 of the set point pressure adjustment member 160 includes a threaded portion 170 sized and configured for engaging corresponding threads 112 at one end of the port 109 in order to create positive and adjustable engagement. The distal end 166 of the adjustment member 160 retains a valve seat 174, which can integrally formed as part of the adjustment member 160 or can be separately attached thereto. The valve seat 174 can be defined by a flat planar surface or alternatively by a curved (e.g., concave or convex) surface, such as shown in FIG. 2. The proximal portion 168 of the set point pressure adjustment member 160 further includes the exterior engagement feature, such as a slot or spaced openings 167 in accordance with this embodiment to permit axial adjustment of the set point pressure adjustment member 160 using a tool (e.g., a screwdriver or hex drive), through axial movement of the set point pressure adjustment member 160 in the defined port 109 of the regulator body 104. The set point pressure adjustment member 160 further includes an annular intermediate groove 175 formed on an exterior wall surface that is configured and sized to permit the inclusion of a sealing member 177, such as an elastomeric ring, within the interior wall of the defined port 109.

In operation, movement of the biased piston stem 124 in the junction 114 between the distal open end 125 of the piston stem 124 and the valve seat 174 enables gas (LNG) entering from the inlet port 110, passing through the filter port (not shown) and entering the interior of the regulator 100 and more specifically the interior chamber 111 to flow through the open distal end 129 of the hollow interior 127 of the piston stem 124 and toward the outlet port 116. The axial position of the valve seat 174 enables the set point pressure to be adjusted by varying the distance between the open distal end 125 of the piston stem 124 and the valve seat 174 using a hex tool or flat head screwdriver (not shown) in order to make the needed axial adjustment using the externally accessible engagement feature 167. For example, moving the valve seat 174 closer to the open distal end 125 of the piston stem 124 initially decreases the set point pressure, while retracting the set point pressure adjustment member 160 axially will increase the set point pressure.

With reference to FIGS. 2 and 3 and in the open position, entering gas is permitted to flow through the hollow axial interior of the piston stem 124, wherein the flow of LNG enters the cavity 141 which is formed between the proximal end surface 135 of the piston head 124 and the wall of the body 104 having the outlet port 116. As gas fills this volume, resulting pressure is placed upon the proximal end surface 135 of the piston head 124. This pressure results in the movement of the piston assembly 120, and more specifically the piston stem 124 toward the valve seat 174. Eventually, contact is made between the valve seat 174 and the open distal end 125 of the piston stem 124, preventing the further flow of gas and in which the amount of pressure required to engage the valve seat 174 (set point pressure) is suitably adjusted by axial movement of the valve seat 174 via the threaded set point pressure adjustment member 160, as is shown in FIG. 4.

With further reference to FIGS. 1-4 and 6 and according to at least the specific embodiment discussed herein and in addition to the cooling ports 119, 121, the pressure regulator 100 further includes a heater assembly 190 disposed in relation to the outlet port 116. The heater assembly 190 is transversely disposed relative to the defined gas flow path of the regulator 100 prior to porting of the outlet gas from the pressure regulator 100. According to this specific embodiment, the heater assembly 190 is defined by an elongate housing or body 194 fabricated from a thermally conductive material, such as, for example, aluminum. The elongate housing 194 is defined by a hollow interior 196 that is appropriately sized and configured to receive a heating element 198, such as a glow plug or other suitable element and is further defined by a proximal portion 197, an intermediate threaded portion 195 and a distal end portion 199. The distal end portion 199 of the elongate housing 194 is directed through a port of the regulator body 104 that extends transversely to that of the flowing gas in which the housing 194 is secured using the intermediate threaded portion 195 and corresponding threads formed in the port. When assembled and as shown, the distal end portion 199 is sized to extend fully across the gas flow path. According to this specific embodiment, the distal end portion 199 is further defined by a series of spaced fins 200 that are formed on the exterior surface of the body 194 and outwardly extend therefrom. The fins 200 are configured, sized and spaced relative to one another to create a convective effect, along with the radiational or conductive effect of the retained heating element 198 in order to uniformly heat the ported fuel before injecting the ported fuel into an engine (not shown) or other apparatus. It will be readily apparent that various fin designs can be utilized for this purpose. The heater assembly 190, and more specifically the heating element 198, can be energized using a switch (not shown) that is provided on the body 104 of the pressure regulator 100 or alternatively in the vicinity thereof. For example, the switch can enable electrical power to be cut off to the heating element 198 at a preset temperature and in which the switch can be externally or internally provided. For example and according to one version, the heater element 198 can be electrically connected to a controller or control mechanism (not shown) to enable a wireless controlled energization and deenergization of the heater assembly 190 in a manner akin to a thermostat.

PARTS LIST FOR FIGS. 1-6

100 pressure regulator
104 housing (or body)
106 bracket or mounting plate
109 port, body
110 inlet port
111 chamber
112 threads
113 cover
114 junction
115 solenoid valve
116 outlet port
117 diaphragm
118 spring
119 cooling port
120 piston assembly
121 cooling port
124 piston stem
125 open distal end, piston stem
126 spring, biasing
127 interior, hollow (piston)
129 proximal end, piston assembly
132 piston head
133 annular recess
135 end surface, piston head
137 annular outer surface, piston head
139 cavity
141 cylindrical cavity
143 intermediate interior wall
144 sealing member
145 opening, interior wall
146 groove
147 sealing member
160 set point pressure adjustment member
161 annular groove
163 sealing member
164 elongate body, adjustment member
166 distal end, adjustment member
167 externally accessible engagement feature(s), adjustment member
168 proximal end, adjustment member
170 threaded portion
174 valve seat
175 annular intermediate groove, adjustment member
177 sealing member
180 chamber
190 heater assembly
194 body, elongate or housing, heater assembly
195 intermediate threaded portion, heater assembly
196 hollow interior, heater assembly
197 proximal end portion, heater assembly
198 heating element
199 distal end portion, heater assembly
200 set of spaced fins It will be readily apparent that other modifications and variations will become readily evident to a person of sufficient skill in the field that are covered by the inventive concepts described herein, including those that can be covered by the following claims:

The invention claimed is:

1. A gas pressure regulator comprising:
   a regulator body including an inlet port, an outlet port and an interior;
   a piston supported for axial movement within the interior of the regulator body, the piston being hollow and including a first end that extends into a junction and a second end, the second end of the hollow piston being fluidically connected to the outlet port;
   a spring configured for biasing the piston in a first position relative to the junction;
   a set point adjustment member including a valve seat at one end, the set point adjustment member being axially disposed in relation to the first end of the piston wherein open and closed positions are defined in the junction through which gas can be ported along a defined flow path extending through the hollow piston and extending to the outlet port and wherein the set point adjustment member is disposed opposite the first end of the piston and defining a variable spacing therebetween to define the open and closed positions and in which the axial position of the set point adjustment member can be varied in order to adjust set point pressure of the pressure regulator, and
   a heater assembly disposed adjacent the outlet port.

2. The gas pressure regulator according to claim 1, wherein the set point adjustment member includes a threaded portion that is engageable with a threaded port of the regulator body.

3. The gas pressure regulator according to claim 1, in which the set point adjustment member includes at least one externally accessible engagement feature.

4. The gas pressure regulator according to claim 1, wherein the heater assembly includes a heating element retained within a housing and in which a portion of the housing, including the retained heating element, extends transversely relative to gas ported to the outlet port of the regulator.

5. The gas pressure regulator according to claim 4, in which the heater assembly is defined by a set of external fins disposed on the housing portion retaining the heating element.

6. The gas pressure regulator according to claim 3, wherein the at least one externally accessible engagement feature is configured to receive a tool to permit axial adjustment of the set point adjustment member.

7. The gas pressure regulator according to claim 5, including a switch to control the operation of the heating assembly.

8. The gas pressure regulator according to claim 7, wherein the switch is configured to automatically turn off the heating element when a preset temperature is reached.

9. The gas pressure regulator according to claim 1, including fluid conduit means for conduiting fluid through the regulator body for heating the gas.

10. The gas pressure regulator according to claim 1, wherein the ported gas is liquefied natural gas.

11. The gas pressure regulator according to claim 10, wherein the regulator is used in a natural gas vehicle.

12. A method for adjusting the set point pressure of a liquefied natural gas (LNG) pressure regulator, the method comprising:
porting LNG through an inlet port of the pressure regulator to a junction, the junction including a biased piston including a hollow piston stem and a valve seat; and
adjusting the axial position of a set point adjustment member having the valve seat.

13. The method according to claim 12, in which the adjusting step includes the additional step of:
providing at least one externally accessible engagement feature on the set point pressure adjustment member.

14. The method according to claim 12, including the step of heating the regulated gas prior to porting of the regulated gas from an outlet port of the pressure regulator.

15. The method according to claim 14, including the step of disposing a portion of the heating assembly transversely into a gas flow path of the regulator adjacent an outlet port of the pressure regulator.

16. The method according to claim 14, wherein an extending portion of the heater assembly includes a set of spaced fins on an exterior surface thereof.

17. The method according to claim 12, including the step of circulating a heated fluid through a body of the regulator in order to heat the LNG.

18. The method according to claim 14, including the step of providing a switch connected to the heating assembly, the switch being configured to deactivate a heating element when a preset temperature is reached.

19. A gas pressure regulator comprising:
a regulator body including an inlet port, an outlet port and an interior;
a piston supported for axial movement within the interior of the regulator body, the piston being hollow and including a first end that extends into a junction and a second end, the second end of the hollow piston being fluidically connected to the outlet port;
a spring configured for biasing the piston in a first position relative to the junction; and
a set point adjustment member including a valve seat at one end, the set point adjustment member being axially aligned with the first end of the piston wherein open and closed positions are defined between the valve seat of the set point adjustment member and the first end of the piston in the junction through which, in the open position, gas can be ported along a defined flow path extending through the hollow piston and extending to the outlet port and in which the valve seat engages the first end of the piston in the closed position to prevent the porting of gas and in which the axial position of the set point adjustment member can be varied to adjust the spacing between the valve seat and the end of the piston in the open position in order to adjust set point pressure of the pressure regulator.

20. The gas pressure regulator according to claim 19, wherein the set point adjustment member includes at least one externally accessible engagement feature for varying the axial position of the set point adjustment member.

* * * * *